Patented July 7, 1953

2,644,807

UNITED STATES PATENT OFFICE 2,644,807

POLYVINYL ACETAL RESINS

Herman S. Bloch, Chicago, Ill., assignor to Universal Oil Products Company, Chicago, Ill., a corporation of Delaware No Drawing. Application March 8, 1951, Serial No. 214,645

8 Claims. (Cl. 260—73)

This application is a continuation-in-part of my copending application Serial No. 750,361, filed May 24, 1947, now Patent No. 2,545,683, March 20, 1951.

The present invention relates to the production of resinous condensation products broadly characterized as polyvinyl acetal compounds. More specifically, the invention concerns a process for producing said resins which comprises reacting an ammonia condensation product of a carbonyl compound hereinafter more specifically characterized, with a polyvinyl alcohol or a partially hydrolyzed ester thereof. The primary object of the present invention, therefore, is to provide a process for the production of said resinous condensation products wherein the above general classes of reactants are utilized.

It is another object of the invention to produce resin-like condensation products useful as moldable resins per se or as components of various compositions, as for example in the formulation of paints, varnishes, lacquers, laminates, adhesives, and the like.

Still another object of the invention is to prepare resinous products having either thermoplastic or thermosetting properties depending upon the character of the reactants utilized in the preparation thereof and upon the conditions selected for effecting the condensation reaction involved in the formation of the present acetal type of compounds.

Broadly, the invention comprises reacting at condensation reaction conditions at least a partially hydrolyzed ester of a polyvinyl alcohol and an ammonia condensation product of a carbonyl compound selected from the group consisting of the saturated and unsaturated aliphatic, alicyclic, and aromatic aldehydes and ketones.

Another embodiment of the present invention concerns a process for the production of an acetal type of resinous condensation product which comprises reacting at condensation reaction conditions a plurality of reactants consisting essentially of (1) a partially hydrolyzed polyvinyl alcohol ester homopolymer and (2) an ammonia condensation product of a carbonyl compound selected from the group consisting of the aliphatic, cycloaliphatic, and aromatic aldehydes and ketones containing no other ammonia-reactive radical than the carbonyl radical.

In accordance with one of its more specific embodiments, the invention comprises reacting a plurality of reactants consisting essentially of (1) a polyvinyl alcohol compound selected from a polyvinyl alcohol and a partially acylated-polyvinyl alcohol and (2) a condensation product of ammonia with carbonyl compound containing no other ammonia-reactive group than the carbonyl radical, at a temperature of from about 10° to about 150° C. in the presence of a mineral acid as catalyst for the condensation reaction and a solvent which mutually dissolves at least one of said reactants, thereafter removing said solvent and said catalyst and recovering from the reaction mixture the resultant polyvinyl acetal condensation product as the resinous condensation product of this invention.

Another specific embodiment of the invention relates to a process which comprises reacting polyvinyl acetate and a primary imine, the reaction being effected in the presence of a sufficient quantity of hydrochloric acid to form the hydrochloride of said imine at a temperature of from about 30° to about 100° C. and for a period of time sufficient to not only hydrolyze the polyvinyl acetate but also to effect the condensation of said polyvinyl alcohol compound and said imine to form thereby an acetal type of linkage and thereafter isolating from the reaction mixture the condensation product of the resulting acetalation reaction.

Other embodiments relating to specific reactants and to means for conducting the reaction will be hereinafter described in greater detail.

The reaction mechanism involved in the formation of the present resinous condensation product is believed to be essentially an acetalation reaction between a polyvinyl alcohol which may be partially acylated and an ammonia-carbonyl condensation product, the reaction being illustrated, for example, in the following general equation wherein the polyvinyl alcohol reacting component is represented by a portion of the polyvinyl chain present in the polymer and the ammonia condensation product of a carbonyl compound by an imine comprising one of the specific classes of condensation products contemplated herein.

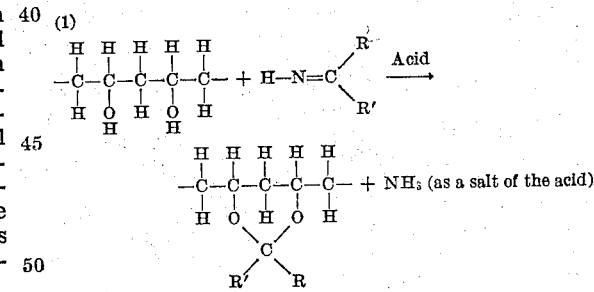

wherein R may be hydrogen and R and R' are selected from the group consisting of alkyl, alkenyl, cycloalkyl, aryl, aralkyl, or a heterocyclic radical. The polyvinyl reactant, represented by a segment of the polyvinyl alcohol chain in the above formula, is usually a polymer of from about 5,000 to about 100,000 molecular weight. Although some of the hydroxyl groups attached to individual carbon atoms of the polyvinyl chain may be replaced by ester groups, it is apparent, on the basis of the reaction mechanism involved in the formation of the present acetal linkage, that at least a portion of the hydroxyl groups present in polyvinyl alcohol must remain free and non-acylated, since acetal formation is dependent upon the condensation between a free hydroxyl group and the ammonia-carbonyl linkage of the condensation product.

The reactant herein referred to as a polyvinyl alcohol or an ester thereof at least partially hydrolyzed, is a polymer of polyvinyl alcohol or its partial ester having a molecular weight of at least 5,000, preferably of from about 20,000 to about 100,000. The partially hydrolyzed esters may be represented as polyvinyl alcohols in which a portion of the hydroxyl groups are esterified by an organic acid radical, although the preferred polyvinyl reactants are the partial esters of polyvinyl alcohol at least 90% hydrolyzed. A completely esterified organic ester of polyvinyl alcohol such as the acetate, propionate, butyrate, sebacate, benzoate, phthalate, etc. may also be utilized as the polyvinyl reactant in the present condensation reaction when reaction conditions and a hydrolyzing agent present in the reaction mixture are selected so as to effect at least a partial hydrolysis of the polyvinyl ester.

The hydrolyzing agent incorporated into the mixture of reactants when the latter completely esterified polyvinyl alcohols are employed as reactants is usually a strong aqueous mineral acid such as hydrochloric acid, sulfuric acid, phosphoric acid, etc., which not only catalyzes the condensation reaction or acetal formation but also concomitantly hydrolyzes a portion of the ester linkages to provide free alcohol groups essential to the acetal-forming reaction. Although it is presumed that the acid-catalyzed reaction proceeds in this manner, that is by hydrolysis of the ester to liberate free alcohol groups which are subsequently acetalized, it is possible that there is a direct reaction between the polyvinyl alcohol ester and the ammonia-carbonyl compound condensation product, whereby, under the influence of the aqueous acid, the acetal is formed, together with free organic acid and ammonium salts.

When desired, partial or complete hydrolysis of the polyvinyl alcohol ester may be effected prior to charging the reactants into the process and for this purpose it is desirable that at least 25% and higher, and preferably, at least 90%, up to substantially complete hydrolysis, of the ester linkage be effected, since in general, the properties of the product are directly dependent upon the extent of hydrolysis obtained either before or during the condensation reaction. It has been noted, for example, that by increasing the percent of hydrolysis, the softening point, tensile strength, hardness etc. of the product is increased, whereas the solubility of the product in various organic solvents and its flexibility is generally lowered. The above properties and others, such as the impact strength are also dependent upon other factors involved in the reaction, such as the type of carbonyl compound utilized in the preparation of the condensation product thereof with ammonia, the molecular weight of the polyvinyl alcohol or its ester and the degree of cross-linking or bridging obtained during the condensation or acetal-forming reaction.

In the production of the present resinous condensation products, it has been noted that when condensation is effected under certain conditions of operation, as hereinafter specified, the resinous product acquires the properties of a thermosetting type of resin and it is believed that the result is dependent upon the formation of the so-called "bridging" or "cross-linking" obtained between individual polyvinyl alcohol or partial ester molecules. The reaction mechanism for the formation of the present product, as proposed in Equation 1 above, wherein the following type of linkage is established, (A)
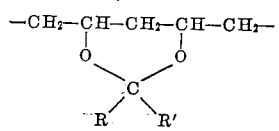

represents but one type of acetal linkage obtained in the condensation reaction; under conditions of reaction in which cross-linking is obtained, the above type A acetal linkage is substituted at least partially by the bridged type of linkage indicated by the following formula:

(B)
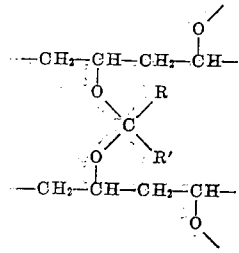

Formula A above is an acetal structure formed by a condensation reaction occurring between the adjacent free hydroxyl groups on the same polyvinyl chain of carbon atoms and is the type of linkage usually formed. Type A linkage ordinarily gives rise to resins having thermoplastic properties and relatively low melting points. Formula B represents the bridged type acetal linkage obtained by a condensation occurring between the ammonia-carbonyl reactant with free hydroxyl groups on different polyvinyl chains and is apparently formed to a minor extent under most conditions of acetylation. Cross-linkage may be favored, however, by the use of a relatively slightly hydrolyzed polyvinyl alcohol ester or by the use of a polymeric ammonia-carbonyl condensation product as hereinafter described. If the degree of hydrolysis is small, the probability of the existence of free hydroxyl groups in the positions required to form type A linkages is reduced, and cross linkages of the type represented by Formula B are more likely. The latter type B linkage is believed to be involved in the formation of thermosetting resinous products and is not necessarily limited to cross-linkage between merely two molecules of polyvinyl reactant but may involve a number of individual polyvinyl alcohol molecules containing a multiplicity of hydroxyl groups resulting in the formation of large resin molecules having high melting points and relatively low solubility in organic solvents.

By varying one or more of the factors which determine the course of reaction, that is, the reaction temperature, the degree of hydrolysis of the polyvinyl alcohol ester, the structure of the carbonyl compound involved in the ammonia-carbonyl reaction product, the viscosity (that is, the molecular weight) of the polyvinyl reactant and the presence or absence of a catalyst in the reaction mixture, it is possible to obtain resinous products having a wide variation in properties ranging from thermoplastic to thermosetting types, from hard to soft resins, and from low melting to high melting products.

The reactant of the present resin-forming condensation reaction characterized herein as a condensation product of ammonia and a substituted carbonyl compound selected from the aldehydes and ketones and containing no other ammonia-reactive substituents other than a carbonyl group is prepared prior to the resin-forming reaction by the condensation of ammonia with an aldehyde or ketone to form a primary imine or an addition product of the reactants which is capable of regenerating the carbonyl compound in the presence of the acidic condensation catalyst utilized in the present resin-forming reaction. In the preparation of an ammonia-carbonyl reactant, suitable aldehydes and ketones may be selected broadly from the various classes of these compounds, including the aliphatic, cycloaliphatic, and aromatic aldehydes and ketones such as the dialkylketones, the diarylketones and the mono-alkyl-mono-arylketones, in which the alkyl substituents generally contain not more than about 12 carbon atoms per alkyl group. Thus, acetaldehyde, propionaldehyde, crotonaldehyde, butyraldehyde, isobutyraldehyde and homologs are typical of the large number of aldehydes utilizable in the condensation reaction with ammonia, as well as the aromatic-substituted aldehydes such as benzaldehyde, tolualdehyde, cinnamaldehyde and others. The homologs of formaldehyde are particularly useful, especially those having up to about 9 carbon atoms per molecule, since the latter form polyvinyl acetals having useful solubility properties and have a relatively high resistance to weathering and stabiilty to light. Of the ketones utilizable in the preparation of the ammonia-carbonyl condensation product, those compounds which regenerate either the original ketone itself or a modified ketone upon treatment with a strong, relatively concentrated mineral acid may be utilized in the condensation reaction with ammonia to form the initial ammonia-carbonyl reactant of this process. Thus, the dialkylketones, such as acetone, methylethylketone, dibutylketone, etc., and the alkyl-cycloaliphatic ketones, such as methylcyclo-hexylketone and the dialkenyl- and alkylalkenyl ketones such as methylvinylketone, mesityloxide, phorone, etc. yield a condensation product with ammonia which either regenerates the initial ketone starting material in the presence of a strong mineral acid during the reaction of the condensation product with the polyvinyl alcohol compound or yields a modified ketonic compound capable of reacting with the polyvinyl alcohol compound to form an acetal derivative thereof. Liksewise, the mono-aryl-mono- alkyl ketones, such as acetophenone yield an ammonia-carbonyl condensation product which regenerates a modified ketonic product in the presence of the mineral acid catalyst and polyvinyl alcohol reactant. The modified ketone and polyvinyl alcohol compound condense in the presence of the mineral acid catalyst to form the present ketal compound, the groups R and R' of the representative empirical formula corresponding to the alkyl or alkylene substituents attached to the carbonyl group of the modified ketone. Many of the present carbonyl compounds when reacted with ammonia yield polymeric carbonyl-ammonia addition compounds. Thus, for example, propionaldehyde forms a "pentamer"; butyraldehyde forms a "heptamer" characterized as oxyheptaiso-butylidene amine which regenerates isobutyraldehyde upon aqueous acid hydrolysis. The aldehyde and ketones may further be employed in admixture with each other or with other members of the same group to form the ammonia carbonyl reactant. Another class of compounds utilizable in the present process, some members of which are formed by the condensation of an aldehyde or ketone with ammonia are the primary imines which yield the carbonyl compound and ammonia upon acid hydrolysis; thus, the ammonia condensation product of benzophenone (iminobenzophenone) upon acid hydrolysis in the presence of a mineral acid catalyst yields benzophenone and the ammonium salt of the acid catalyst. Likewise β-phenylacetaldimine hydrolyzes in acid solution to form acetophenone, condensable with the polyvinyl alcohol compound to form the present acetal products, and the ammonium salt.

The condensation of ammonia with the carbonyl compound is generally obtained readily by merely leading dry ammonia gas into the stirred carbonyl compound until reaction ceases at a temperature of from about 0° to about 100° C. or by countercurrent contact of the ammonia gas with the aldehyde or ketone, for example, by charging the ammonia gas into the bottom of a vertical, packed tower while charging the carbonyl compound in liquid phase into the top of the tower and allowing the same to flow downwardly over the packing material in contact with the rising ammonia gas. In general, an equimolar ratio of ammonia and aldehyde or ketone is utilized in the reaction to form a primary imine and larger than equimolar ratios of aldehyde or ketone, up to about 10 to 1, are preferred when preparing the aldehyde-ammonia or ketone-ammonia condensation products, particularly the polymer condensation products.

The condensation reaction of this invention, whereby a resinous product containing acetal linkages is formed, may be conducted either in the presence of certain catalytic agents or in their absence, and generally the question of whether a catalyst is to be used or not will depend upon the readiness with which the reactants tend to form the acetal linkage in its absence. The catalyst may be described as an acidic substance which may be selected from certain inorganic, strong mineral acids. When utilized, a mineral acid, such as concentrated aqueous hydrochloric or sulfuric acid containing from about 10 to 85% acid, is preferred and is added directly to the reaction mixture in sufficient quantity and/or concentration to result in an acidic reaction mixture. Anhydrous hydrogen chloride in an anhydrous reaction system is sometimes effective, permitting the complete utilization of the ammonia-carbonyl condensation product if a slight excess of the acid is present. The catalyst may be subsequently removed from the resinous product by contacting the mixture with a solvent which has a selective solubility for the catalyst, such as an aqueous alkaline solution, or, alternatively, the resin may be dissolved from the catalyst in a solvent which selectively dissolves the resin, such as benzene, methyl alcohol etc.

When a completely esterified polyvinyl alcohol is charged into the reaction mixture, the acid catalyst serves as a hydrolyzing reagent as well as a condensation catalyst and under such conditions a strong and preferably concentrated mineral acid catalyst is required in order to obtain the condensation reaction by the simultaneous partial hydrolysis of the ester and acetalation. In such a procedure, the polyvinyl alcohol or its partial ester, the acid catalyst, and the ammonia-carbonyl reactant are combined prior to the reaction and heated for a period of time sufficient to obtain the desired degree of hydrolysis and acetalation in the same reaction mixture. The proportion of reactants in the reaction mixture may be varied to form a product containing any desired proportion of ester groups, free hydroxyl groups and acetalated hydroxy groups, the properties of the resultant resin varying in accordance with the relative number of said groups.

Under certain conditions of reaction and when utilizing certain types of reactants, it is desirable to conduct the reaction in the presence of an inert solvent for one or more of the reactants. The solvent is preferably selected from the hydrocarbons such as benzene, toluene, butane, hexane, etc. and the inert halogen-substituted hydrocarbon such as ethylene dichloride, carbon tetrachloride, propylene dichloride, etc. The solvent tends to modify the rate of reaction and the type of product obtained from the condensation reaction, although it does not of itself enter the reaction as a reactant, the products, in general being lighter in color than when a reaction system is utilized in which the solvent is absent.

The resin-forming reaction of the present invention may generally be initiated at relatively low temperatures, as for example, temperatures within the range of from about 30° to about 90° C. although in the case of some reactants, the temperature may be as low as about 10° C. and as high as about 150° C. Superatmospheric pressures are generally unnecessary, except in the case of the low boiling reactants and solvents, in which case it is desirable to utilize pressures sufficient to maintain at least one of the vaporizable components substantially in liquid phase during the reaction. The proportion of ammonia-carbonyl reactant in the resin-forming condensation reaction mixture determines the amount of acetal formation and the latter may be varied from slight to essentially complete acetalation. It is generally preferred to utilize an equivalent ratio of polyvinyl compound to ammonia-carbonyl reactant of from about 1:1 to about 10:1, where the equivalent proportion of the polyvinyl compound is based upon the number of equivalents of monomeric vinyl alcohol pairs in the molecule of polymer. As indicated previously, the amount of cross-linkage between the reactants depends in part upon the number of free hydroxyl groups in the structure of the polyvinyl reactant involved in the condensation reaction, which in turn is determined by the degree of esterification and/or hydrolysis of the polyvinyl ester charged to the reaction. For the production of high melting point resins, it is desirable to have sufficient ammonia-carbonyl reactant present in the reaction mixture to condense with a large proportion of the hydroxyl groups of the polyvinyl compound.

A typical process for the preparation of the present resinous product comprises reacting the polyvinyl reactant, such as a completely esterified polyvinyl acetate, with from about one-tenth to about 1 weight proportion of the condensation product of a ketone with ammonia, stirring the mixture with a slight excess of strong aqueous sulfuric acid, dissolving the resulting mixture in from about 1 to about 10 volume proportions of a suitable solvent, such as toluene and heating the mixture in a closed system to the desired reaction temperature, generally from about 30° to about 90° C. Following the reaction period of from about 10 minutes to about 2 hours, the contents of the reactor are cooled, diluted with water and the precipitated polyvinyl acetal resin washed and dried. The resulting aqueous solution may be concentrated to recover the salts or subsequently treated with an alkali to liberate ammonia from the salt formed by reaction of the acid catalyst with the ammonia formed in the condensation reaction. The recovered ammonia may then be recycled to the initial stage of the reaction to form the ammonia-carbonyl reactant for reuse therein.

The polyvinyl acetal resins formed in the present invention have a wide field of utility, especially in the formulation of lacquers, adhesives, coating compositions, such as paints and varnishes, laminates (for example, safety glass), molding compositions, etc. One of the outstanding uses of the resins is in the preparation of coating compositions, such as lacquers, paints and varnishes where the resin is dissolved in a suitable solvent to form a lacquer or in a drying oil and pigment to form a paint composition. The thermoplastic type of resin produced by the present process may be molded into various articles by hot-molding, the resin usually providing a transparent or translucent plastic-like product. The resins are soluble in various organic solvents such as the alcohols, in the low molecular weight ketones such as acetone, in certain esters such as ethyl acetate, and in various hydrocarbons such as benzene and toluene and many of the resins are soluble in drying oils of the hydrocarbon and the unsaturated fatty acid glyceride type.

It should be pointed out that the ketals of polyvinyl-alcohol are not readily formed by the direct reaction of the ketone and the alcohol; in the present method, however, the use of ketimines, ketone-ammonia addition products, permits the preparation of such products conveniently and in good yields.

The following example is introduced for the purpose of illustrating the process and product of the present invention. In thus illustrating a typical procedure, it is not intended to limit or define the scope of the invention in any of its broad aspects in strict accordance therewith.

Example I

Polyvinyl acetate having a viscosity of 15 centipoises at 20° C. in benzene solution (8.6 g. per 100 ml.; i. e. a 1 molar solution based on the monomer) was hydrolyzed by refluxing in a dilute aqueous alcoholic solution of sodium hydroxide until the product, as shown by the acetyl number thereof, contained only 9.5% of its original acetyl content. The hydrolyzed product was washed, suspended in toluene (in which it showed considerable solubility), and an equivalent amount of butyraldehyde-ammonia heptamer (oxyheptaisobutylidene amine), prepared by the reaction of butyraldehyde with aqueous ammonia at 30° C., was added. Sulfuric acid (50% aqueous) was slowly run into the mixture until an acid reaction was obtained, and a slight excess then added. The mixture was thereupon heated for three hours at 50° C. following which it was neutralized and pentane added to precipitate the resin from its toluene solution. The precipitated resin was filter dried, and the product then further dried in a vacuum desiccator. The product was a polyvinyl butyral resin containing 9.0% free hydroxyl groups. It was thermoplastic and could be readily molded at 300° F. and 1500 p. s. i. pressure.

Example II

The partly acetylated polyvinyl alcohol used in Example I was, by a procedure similar to that of the previous example, reacted with the following ammonia-carbonyl compound condensation products:

β-Phenylacetaldimine, prepared by reduction of β-phenylacetonitrile.
Hexamethylenetetramine
Benzophenoneimine
Hydrobenzamide, $(C_6H_5CH)_3N_2$
Acetophenone-ammonia, $(C_6H_5CH_3C)_3N_2$
Diacetoneamine, $CH_3COCH_2 - CNH_2(CH_3)_2$, prepared from acetone and ammonia.

In each case, a water-insoluble acetal or ketal resin of reduced hydroxyl content was produced.

I claim as my invention:

1. A process for the production of an acetal type of resinous condensation product which comprises reacting at condensation reaction conditions a plurality of reactants consisting essentially of (1) a partially hydrolyzed polyvinyl alcohol ester homopolymer and (2) a condensation product of butyraldehyde and ammonia, said reactants being reacted in the presence of a sufficient amount of an acidic condensation catalyst to form an acidic reaction mixture.

2. The process of claim 1 further characterized in that said catalyst comprises a strong mineral acid.

3. The process of claim 1 further characterized in that said reactants are reacted in the presence of an inert organic solvent for at least one of said reactants.

4. The process of claim 3 further characterized in that said organic solvent is hydrocarbon.

5. The process of claim 1 further characterized in that said reactants are reacted at a temperature of from about 10° C. to about 100° C. and at sufficient pressure to maintain the reactants substantially in liquid phase.

6. The process of claim 1 further characterized in that said reactant (1) is at least partially hydrolyzed polyvinyl acetate.

7. The process of claim 1 further characterized in that said reactant (1) is a partial ester at least 90% hydrolyzed.

8. The resinous condensation product of a partially hydrolyzed polyvinyl alcohol ester homopolymer and a condensation product of ammonia and butyraldehyde.

HERMAN S. BLOCH.

References Cited in the file of this patent

UNITED STATES PATENTS

| Number | Name | Date |
|---|---|---|
| 2,168,827 | Morrison | Aug. 8, 1939 |
| 2,328,057 | Coulter | Aug. 31, 1943 |
| 2,387,833 | Dahle | Oct. 30, 1945 |
| 2,471,497 | Roberts | May 31, 1949 |

OTHER REFERENCES

Robitschek, Phenolic Resins, pages 31, 32, 34, 35, Iliffe and Son (London, 1950). Copy in Division 50.